UNITED STATES PATENT OFFICE.

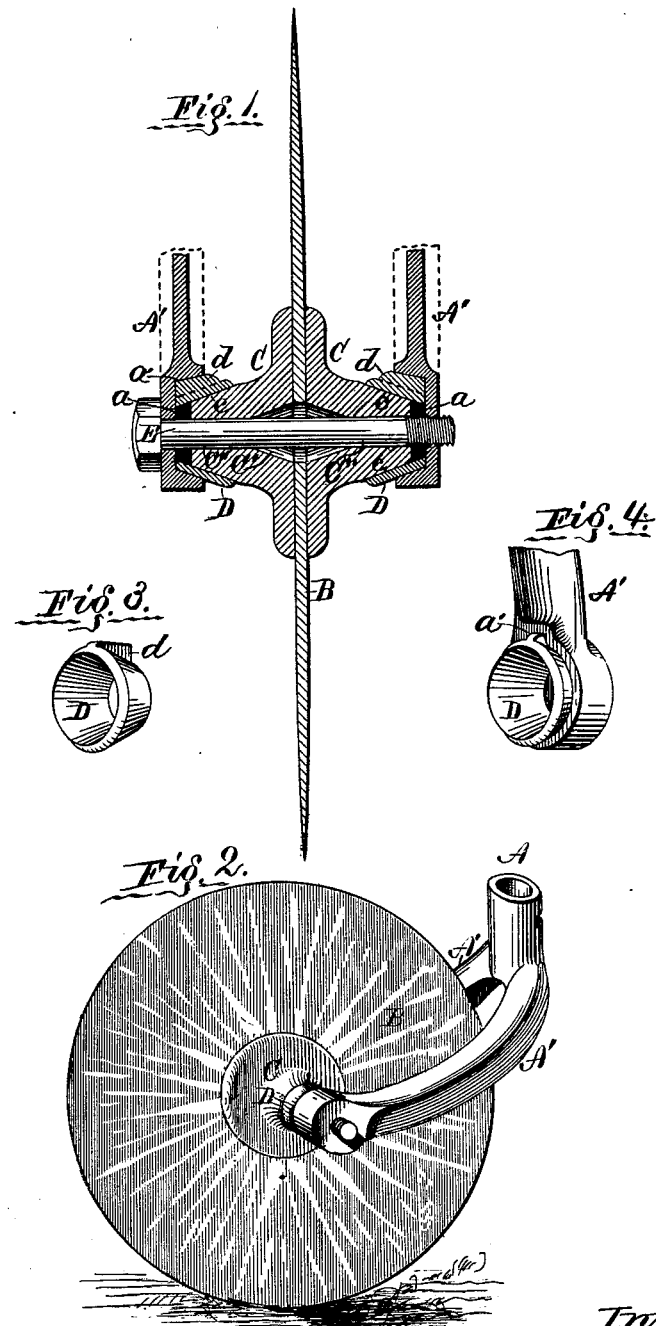

GILPIN MOORE, OF MOLINE, ILLINOIS, ASSIGNOR TO DEERE & CO., OF SAME PLACE.

IMPROVEMENT IN COLTER-JOURNALS.

Specification forming part of Letters Patent No. 188,750, dated March 27, 1877; application filed January 13, 1877.

*To all whom it may concern:*

Be it known that I, GILPIN MOORE, of Moline, in the county of Rock Island and State of Illinois, have invented certain new and useful Improvements in Journaling Plow-Colters; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to improvements in journaling circular colters to the yokes by which they are secured to plows, to adapt them to withstand the increased strains to which they are subjected by use upon wheel-plows.

The invention consists, primarily, in constructing the bosses of the colter with journal ends, which are provide with suitable bearings in or attached to the yoke. It further consists in constructing the bosses having the frusto-conical ends with a central aperture having an enlarged part next the colter, and a contracted portion at their outer ends, which enlarged portion may serve as an oil-reservoir, and the contracted portion form a bearing-surface on the axial bolt.

The invention further consists in the use of substitutive boxes, having frusto-conical shaped recesses for bearings for the colter-bosses, so constructed that they can be readily and easily secured in the ends of the yoke-arms.

In the accompanying drawings, Figure 1 is a central horizontal sectional view through a colter, and a construction of parts embodying my invention. Fig. 2 is a perspective view, and Figs. 3 and 4 are detail views.

Referring to the parts by letters, A represents the upper end, and A′ A′ the lower and bifurcated ends or arms, of an ordinary form of yoke for connecting a wheel-colter as a caster-wheel to a plow. B is an ordinary circular plow-colter, with bosses C secured one to each of its sides. The outer ends $c$ of the bosses C are formed tapering outward, as shown at Fig. 1. C′ C″ is an aperture through the bosses C, the central portion C′ of which is enlarged, and the end portions C″ contracted and cylindrical, as shown also at Fig. 1. The frusto-conical surfaces $c$ and the surfaces C″ are preferably cast on a chill. D D are journal-boxes with frusto-conical interior surfaces to receive the similarly-shaped journals $c$, and with exterior surfaces, as desired, but preferably as shown plainly at Fig. 3. The boxes D are preferably of malleable iron, and have each a spline, $d$, upon their exteriors, which spline seats in a groove, $a'$, in a recess, $a$, in the lower end of the arm A′, when said box is fixed in said recess $a$, as shown at Figs. 1 and 4, and thus secures the boxes D from rotating. E is an axial bolt, of a size to fit the contracted aperture C″. The bolt E passes through the parts, as shown at Fig. 1, and may be tapped into one of the arms A′, as shown at same figure; or it may have a nut on its threaded end.

The journals $c$ are of such relative diameter to the recesses in the boxes D that they do not extend through the boxes D, as shown at Fig. 1, and thus afford facilities, in an evident manner, for tightening up the bearings, by drawing the arms A′ toward each other by means of the bolt E, and thus, in connection with the bearings at C″ on the bolt E, producing bearings which, after wearing, can be tightened up, as described, so as to hold the colter B firmly and true in the heavy work required with gang and sulky plows.

The enlarged aperture C′ may be used as an oil-reservoir.

The tubular boxes D are substitutive, and may be replaced by new ones when broken or worn. It will be evident, also, that suitable recesses may be made in the ends of the arms A′, and the boxes D dispensed with.

Having thus described my invention, what I claim as new, and desire to secure by Letters Patent, is—

1. The plow-colter bosses C, having frusto-conical ends $c$, arranged to operate with similarly-shaped apposed recesses in the arms A′ of the colter-yoke A, substantially as described, and for the purpose specified.

2. The plow-colter bosses C, having frusto-conical ends $c$, arranged to operate with similarly-shaped apposed recesses in the arms A', and with the tightening-bolt E, substantially as described, and for the purpose specified.

3. The plow-colter bosses C, having frusto-conical ends c, arranged to operate with similarly-shaped recesses in the arms A', and having a portion of their central aperture C'' fitted and journaled on the bolt E, which bolt E serves at the same time as a tightening bolt, substantially as and for the purpose specified.

4. The substitutive journal-boxes D, arranged to operate with the bosses C, arms A', and bolt E, substantially as described, and for the purpose specified.

5. A plow-colter, B, having bosses C with tapering ends, which are formed into journals, and a central opening for an axial bolt, E, substantially as and for the purpose specified.

6. A wheel or colter, B, having bosses C, the ends of which are formed into journals, combined to operate with bearings in the arms A', substantially as and for the purpose specified.

In testimony that I claim the foregoing as my own I affix my signature in presence of two witnesses.

GILPIN MOORE.

Witnesses:
A. M. BEAL,
W. J. ENTRIKIN.